United States Patent [19]

Ellis

[11] 4,233,554
[45] Nov. 11, 1980

[54] VENT ACTUATED SHORTING SWITCH

[75] Inventor: James N. Ellis, Chatsworth, Calif.

[73] Assignee: The United States of America as represented by the Secretary of the Army, Washington, D.C.

[21] Appl. No.: 27,203

[22] Filed: Apr. 5, 1979

[51] Int. Cl.³ .................. H02J 7/00; H01H 35/38
[52] U.S. Cl. .................. 320/46; 200/82 R; 200/163; 320/18
[58] Field of Search .................. 320/6-8, 320/15-18, 46; 200/163, 82 R, 83 J

[56] References Cited

U.S. PATENT DOCUMENTS

| 449,282 | 3/1891 | Clark | 200/163 X |
| 1,585,485 | 5/1926 | Gernsback | 200/163 |
| 1,983,243 | 12/1934 | Rose et al. | 320/46 X |
| 3,003,100 | 10/1961 | Euwema | 320/18 X |
| 3,143,612 | 8/1964 | Nijland | 200/82 R |
| 3,328,663 | 6/1967 | Kagan | 320/17 |

FOREIGN PATENT DOCUMENTS 855935 12/1960 United Kingdom .................. 320/46

Primary Examiner—Robert J. Hickey
Attorney, Agent, or Firm—Nathan Edelberg; Robert P. Gibson; Freddie M. Bush

[57] ABSTRACT

In a high voltage, high ampere battery, a shorting bar is placed on the top of each battery cell vent cap for providing a shorting switch between two extensions from respective cell terminals in response to excessive cell pressure dislocating the vent cap. This effectively removes a defective, potentially explosive cell from the battery output circuit while continuing to apply an output voltage to using circuitry.

2 Claims, 2 Drawing Figures

VENT ACTUATED SHORTING SWITCH

DEDICATORY CLAUSE

The invention described herein was made in the course of a contract with the Government and may be manufactured, used, and licensed by or for the Government for governmental purposes without the payment to me of any royalties thereon.

SUMMARY OF THE INVENTION

A vent actuated shorting switch is placed on the vent cap of each cell of a high voltage, high ampere battery. If a cell becomes open or short circuited, prolonged heat release within the cell can result in rupture of the cell case. The shorting switch is disposed to be driven upward with the vent cap when internal pressure releases the vent. Two terminal extensions for each cell project toward one another across the vent cap so that the shorting switch or blade makes contact and provides battery continuity for the remainder of the cells while bypassing the cell which has failed and removing the danger of cell explosion.

DRAWINGS

DESCRIPTION OF THE PREFERRED EMBODIMENT

Figure 1:
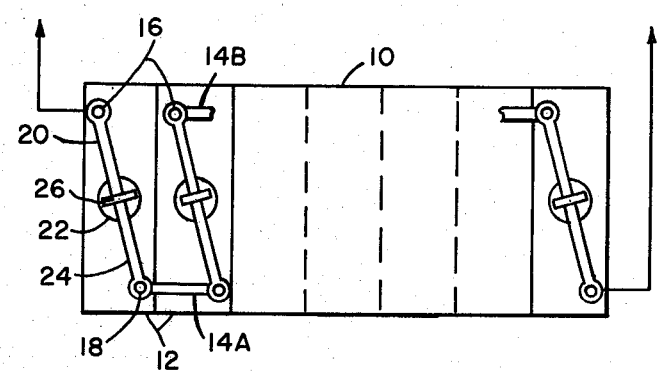
FIG. 1 is a top view of a battery showing respective cells embodying the vent actuated shorting switch.

Referring now to the drawings wherein like numerals represent like parts, FIG. 1 discloses a direct current battery 10 representative of a high voltage, high ampere battery which incorporates the vent actuated shorting switch. Typically, battery 10 is comprised of a plurality of individual containers or cells 12 which are disposed adjacent one another for electrically coupling between cells as shown typically by coupling links 14A and 14B. Each of cells 12 is equipped with a pair of terminals 16 and 18. An extension from each terminal 16, conductor 20, projects over the respective cell vent cap 22. Similarly, an extension from each of terminals 18, conductor 24, projects over the respective cell vent cap 22 such that the two conductor extensions for each cell are substantially disposed along a a common longitudinal axis. The conductors have an air gap between the adjacent ends thereof which prevents arcing thereacross. A conductor 26 is mounted on each vent cap 22 and is conveniently shaped for providing switching contact between respective conductors 22 and 24. Conductor 26 is conveniently shaped as a bar or blade for providing a large contact surface area.

Figure 2:
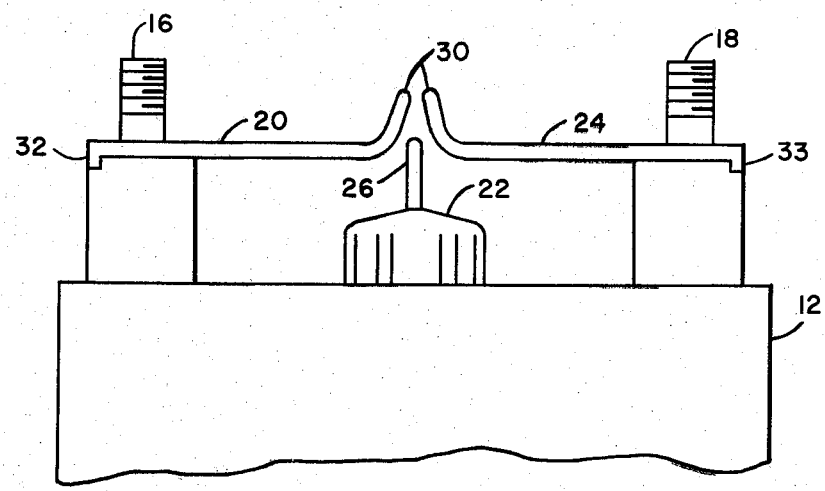
FIG. 2 is a side view of a single battery cell with the vent closed and shorting bar in the open position.

FIG. 2 shows a partial side view of a typical cell with extraneous portions omitted, such as cell connecting links 14. Connectors 2B and 24 have a tip portion 30 turned up for convenient acceptance of wiper blade 26. Conductors 20, 24, and 26 are spaced apart during normal battery operation so that no current flows therebetween. Conductors 20 and 24 may be appropriately positioned in proper mating alignment with blade 26 and held in place by a nut or cap (not shown) over posts 16 and 18. To assure proper alignment a key or guide may be provided such as tabs 32 and 33 for positioning the conductors.

Figure 3:
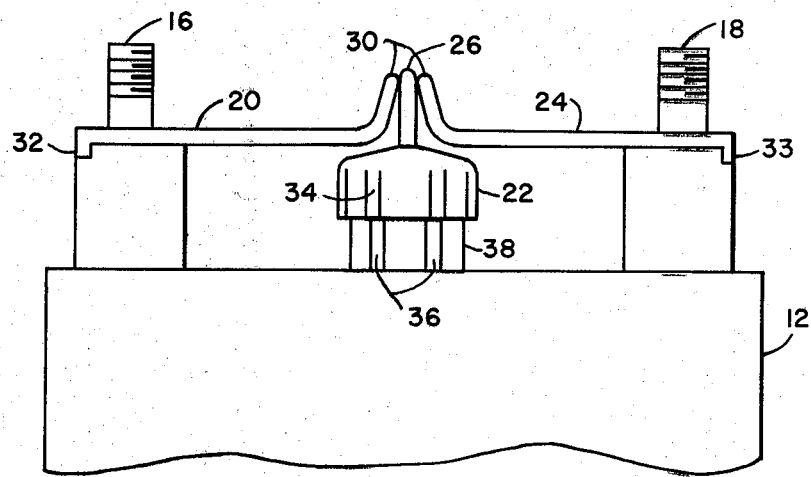
FIG. 3 is a side view of a typical cell with the vent open and the shorting bar in the closed position.

In the operation of a high voltage, high ampere battery, if a cell 12 opens or short circuits internally the heat released within the cell can cause the electrolyte to discharge and may cause the cell housing to rupture. As shown in FIG. 3, with the shorting bar 26 placed on top of the cell vent cap 22, when pressure builds up to the point where the vent opens (typically, this may be established at about 15 psi gage), the vent cap will be pushed away from the cell and close the shorting bar between the two conductor extensions 20 and 24 of the cell terminals. This completely short circuits the cell out of the battery circuit and thereby prevents explosion of the cell and reduces or removes the impedance of the faulty cell from the battery cricuit. When the vent releases, the cap 22 is driven upward by the pressure a distance of approximately $\frac{3}{8}$ to $\frac{1}{2}$ inch, depending on the size of the cell. When the blade moves up it is wedged firmly between the two terminal extensions in a manner similar to the action of a blade switch, providing solid metal to metal contact to short the cell.

As shown in FIG. 3, the vent cap has internal grooves 34 molded into it and the cell case has matching ridges 35 in the vent and filler neck 38 providing a tongue and groove action which guides direction of movement of the cap and prevents the cap turning. This prevents possible misalignment of the shorting bar and prevents possible contact between the bar and the cell terminal extensions while the vent is closed.

Although a particular embodiment and form of the invention has been described, it will be obvious to those skilled in the art that modifications may be made without departing from the scope and spirit of the invention. For example, the contacting surfaces of conductors 20, 24, and 26 may be smooth or roughened. The upper edge of blade 26 may be slightly larger than the body, locking the blade in place once it passes the edge of tips 30. Conductor 26 may have various geometric shapes for enhancing contact and latching with tips 30. Similarly other means than tongue and groove may be provided between the vent cap and filler neck for controlling position and movement of conductor 26. While the invention has been described with respect to battery cells, it is obvious that other containers or housings having electricity supplied thereto and sensitive to internal pressure may be protected by the vent actuated switch. Accordingly, it is understood that the invention is limited only by the claims appended hereto.

I claim:

1. A vent actuated shorting switch comprising: a container having a pressure release opening therein and first and second electrical terminals thereon, first and second electrical conductive extensions projecting from respective of said first and second electrical terminals, respective projecting ends of said extensions being adjacent and positioned above said pressure release opening, a cap moveably disposed and covering said pressure release opening for moving toward and repositioning adjacent said projecting ends of said conductor extensions in response to excessive pressure within said container being released and an electrical conductor fixedly attached to said cap for contacting said conductive extensions and providing electrical connection therebetween in response to said repositioning of said cap adjacent said extensions, said pressure release opening being defined by a protruding neck, said neck having a plurality of ridges on the outer surface thereof, and said cap being slidably disposed on said neck and having a plurality of grooves on the inside thereof for guiding the direction of sliding movement of said cap toward said extensions.

2. A vent actuated shorting switch as set forth in claim 1 wherein said conductor is a shorting bar across the top of said cap and said container is a direct current battery cell.

* * * * *